United States Patent [19]

Sato

[11] 4,237,540
[45] Dec. 2, 1980

[54] TAPE RECORDER WITH TABLE COMPUTER

[75] Inventor: Masaaki Sato, Hatchioji, Japan

[73] Assignee: Olympus Optical Company Limited, Tokyo, Japan

[21] Appl. No.: 15,642

[22] Filed: Feb. 27, 1979

[30] Foreign Application Priority Data

Mar. 1, 1978 [JP] Japan .................................. 53-23295

[51] Int. Cl.³ .......................... G11B 1/04; G06F 15/02
[52] U.S. Cl. .................................... 364/705; 340/711; 340/755; 360/1; 364/708
[58] Field of Search .................. 364/705, 708; D14/5, D14/20, 24, 32, 47, 72; 360/1, 137; 116/DIG. 1, 280; 340/700, 706, 711, 755, 780, 311, 24

[56] References Cited

U.S. PATENT DOCUMENTS

| | | | |
|---|---|---|---|
| 1,090,989 | 3/1914 | Kelly | 340/755 |
| 3,154,636 | 10/1964 | Schwertz | 340/755 |
| 3,555,505 | 1/1971 | Srogl | 340/24 |
| 4,120,037 | 10/1978 | Sato | 364/705 |
| 4,150,435 | 4/1979 | Satoh | 360/31 |

Primary Examiner—Errol A. Krass
Attorney, Agent, or Firm—Toren, McGeady and Stanger

[57] ABSTRACT

A tape recorder calculator is disclosed. The tape recorder comprises a cassette charging portion thereof on one side surface of a polyhedron of a housing and digit keys on an other side surface. The display for displaying counted values is also used as a counter display of the tape recorder and is rotatably provided on one side surface of the polyhedron so as to automatically switch its display function in accordance with rotation of the display.

4 Claims, 8 Drawing Figures

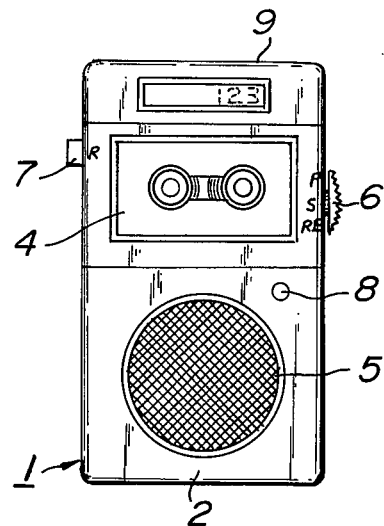
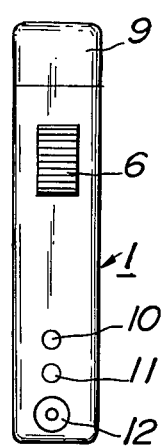
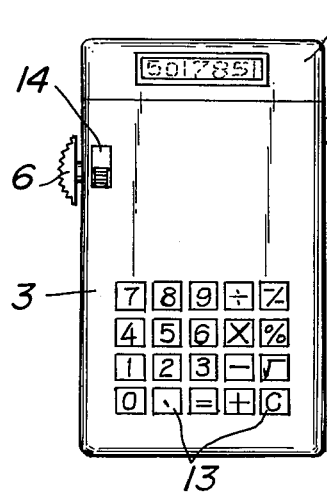
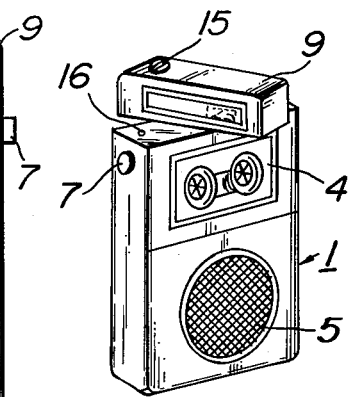

TAPE RECORDER WITH TABLE COMPUTER

BACKGROUND OF THE INVENTION

The present invention relates to a tape recorder with a calculator for displaying a tape recorder function and a calculator function with one display portion on at least a polyhedron of a body.

There have been recently developed various tape recorders provided with many functions, for example, clock, computer and the like, which use a single display portion.

A tape counter of a tape recorder is for example displayed with the aid of a liquid crystal portion, if necessary.

A tape recorder having these many functions, however, is miniaturized by taking portability into consideration, so that a cassette charging portion and a speaker are arranged on one surface of a housing and entry keys of a calculator are arranged on the other surface thereof.

If a display is on one side of a calculator and an operator is looking for the counter of the tape recorder, it is necessary to turn over the tape recorder. This is very inconvenient. If a display portion is provided on the side of a tape recorder, the calculator operation is inconvenient.

SUMMARY OF THE INVENTION

An object of the present invention is to eliminate the above described disadvantages.

Another object of the present invention is to provide a tape recorder with a calculator by forming a rotatable display portion for displaying everything at one portion and automatically displaying the function according to rotation thereof.

According to the present invention a tape recorder with a calculator comprises a cassette charging portion thereof provided on one side surface of a polyhedron of a housing and digit keys provided on another other side surface. The display portion for displaying readout values is also used as a counter display portion of the tape recorder and is rotatably provided on one side surface of the polyhedron so as to automatically switch a display function in accordance with rotation of the display portion.

BRIEF DESCRIPTION OF THE DRAWING

FIG. 1 is a plan view showing one embodiment of a tape recorder with a calculator according to the present invention;

FIG. 2 is a side view showing the tape recorder shown in FIG. 1;

FIG. 3 is a rear elevation showing the tape recorder showin in FIG. 1;

FIG. 4 is a perspective view showing the tape recorder shown in FIG. 1;

DESCRIPTION OF THE PREFERRED EMBODIMENTS

Figure 5:
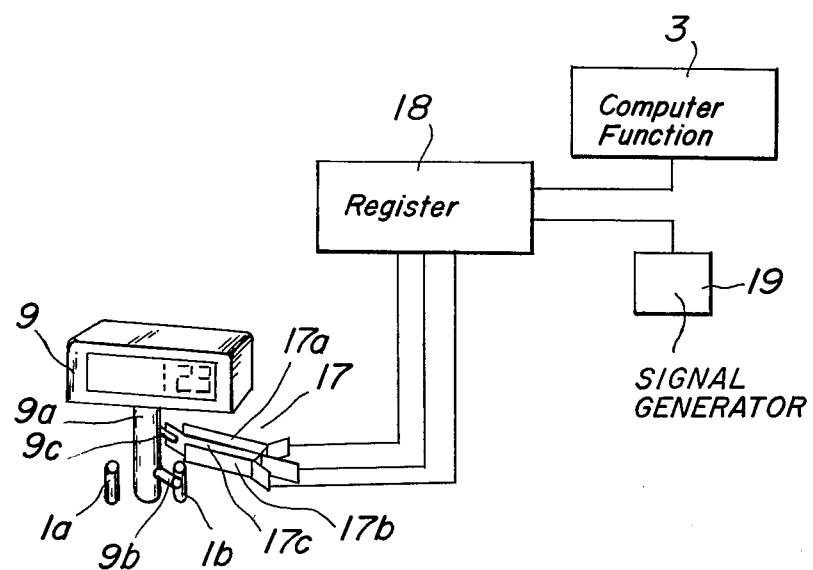
FIG. 5 is a diagrammatic view showing an outline for explaining the essential parts of the tape recorder according to the present invention.

In the drawings, wherein like reference characters designate like or corresponding parts throughout the several views, there is shown a combination tape recorder and calculator according to the present invention. The tape recorder is composed of a main body 1 which carries a tape recorder 2 and a calculator 3. Arranged on the front surface of the tape recorder's main body 1, for example, the face at the tape recorder 2, are a cassette charging portion 4 and a speaker 5. One side surface of the main body 1 is provided with a slide-type operation button 6. The operation or operating button 6 can be operated by a thumb only for playing, stopping or rewinding of a tape. A push-button type recording button 7 protrudes from the other side surface, that is, opposite to the operating button 6, is and recordings can be made by shifting the operating button 6 to play when the recording button 7 is pressed in.

A push button provided under the cassette charging portion 4 is a reset button for setting the display of a display portion or section 9 zero. This will be described later. Three jacks 10, 11 and 12 are provided on the side surface are for an outside microphone, an earphone and an AC adapter, respectively.

On the other hand, arranged on the back of the tape recorder main body 1, i.e., face of the computer or calculator 3, are digit keys 13 at the lower position, and a power supply source switch 14 for the calculator.

Formed on the top of the thus constructed tape recorder main body 1 is an electronic-type display portion 9 using of LED, liquid LEDs, liquid crystals or the like for exhibiting output values from the calculator 3 and displaying count or tape advance of the tape recorder 2. The display portion 9 is to display a display signal sent from both the calculator and recorder as a predetermined numerical value, so that the signal is transmitted through a pivot axis (not shown) of the display portion 9. Further, a microphone 15 provided in the display portion 9 is also connected to an electric system of the tape recorder through the pivot axis.

The tape recorder main body 1 permits 180° rotation of the display portion 9 and connects, through an electrical connection, to the display portion 9. Click stops 16 secure relative positioning of the tape recorder main body 1 and the display portion 9. In addition, the main body 1 is provided with a cell common to the recorder 2 and calculator 3.

When the display portion 9 is rotated or reversed, the display portion is automatically switched between the calculator and the tape recorder. This function will be best understood with reference to FIG. 5. In order to rotate 180° and stop, the display portion 9 is provided with stoppers 1a, 1b on both sides thereof, and an engage pin 9b projecting from a rotary shaft 9a makes into contact with the stoppers.

Further, the above rotary shaft 9a is provided with a switch pin 9c for switching a contact 17a of a switch 17.

The switch 17 is connected to a register 18, and the register 18 counts a counted value from the digit keys 13 and an input from a pulse signal generator 19 from the tape recorder function 2. The numerical value counted by the register 18 is displayed by the electronic-type display portion 9 using liquid crystals, LEDs or the like.

When the thus constructed display portion 6 is rotated, the display portion 9 is automatically switched to explain the display state. FIG. 5 shows the apparatus switched to the tape recorder. That is, with rotation of the display portion 9 the switch pin 9c presses the switch contact 17c of the switch 17 to the counter, i.e., the normally opened contact 17a to close a connection.

The register 18 now counts pulse signals according to the tape recorder drive.

On the other hand, if the display portion 9 is turned to the original position, that is, rotated to the calculator side, the switch pin 9c is separated from the switch contact 17c, so that the switch contact 17c is brought into contact with the constantly closed contact 17b and the register 18 starts to readout the values from the calculator.

Rotating the display portion 9 in this manner automatically and conviently switches the display to the desired device.

In addition, it is easier to generate a pulse signal and switch by rotation of the display portion 9 instead of the switch 17.

When the thus constructed tape recorder with the calculator is used, if the calculator is first used, the display portion 9 faces to the calculator side and the switch 14 is pushed up. Power is now supplied from the common cell source, a desired calculator is carried out, and the, entry or computed, readout value is displayed on the display portion 9.

On the other hand, when the tape recorder 2 is used, the display portion 9 is rotated 180° to face the tape recorder, the operator slides operation button 6 to move a tape, and the amount of advance of the tape is displayed on the rotatable display portion 9.

Thus, when the tape recorder and the calculator are provided on different surfaces and respective readouts are displayed on one display portion, if the display portion is rotatably constructed, the readout function is automatically switched and used merely by moving the display portion to the side of the device to be used, if necessary.

Figure 6A:
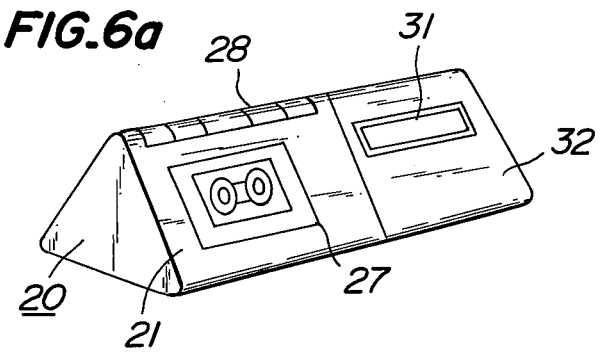
FIGS. 6a to 6c are perspective views showing another embodiment of the tape recorder according to the present invention.
Figure 6B:
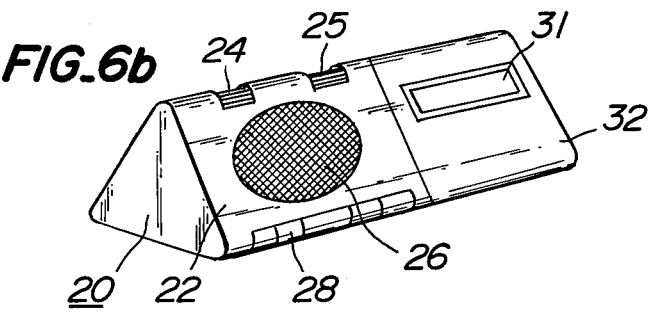
Figure 6C:
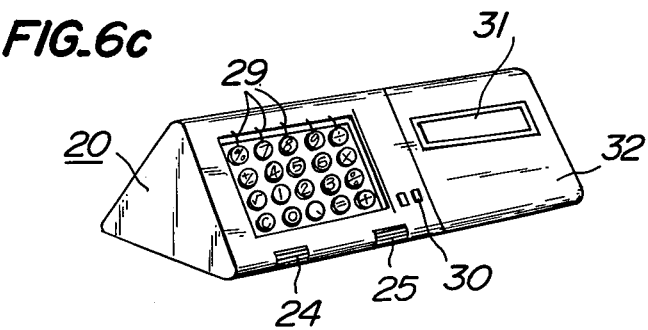

FIGS. 6a, 6b and 6c show another embodiment of a tape recorder system according to the present invention. A tape recorder main body 20 is formed into a triangular column, each surface is provided with a tape recorder 21, a radio 22 and a calculator 23, and the radio 22 is provided with a volume control knob 24, a tuning dial 25 and a speaker 26. The speaker 26 also operates with the tape function 21, and the tape recorder 21 is provided with a cassette charging portion 27 and operation buttons 28. The remaining surface is provided with the computer function 23 having digit keys 29 and a power supply source switch 30.

A display portion 31 for displaying a calculated value of the computer 23 is provided on one side surface of an operation portion 32 rotatably provided on an extended portion of the triangular column 20.

The operation portion 32 can switch modes to be displayed by rotating in accordance with the function to be used. For example, it displays a tape count from the tape recorder and the frequency to which the radio is tuned.

The invention is not limited to the above embodiments, but a coupling of the main body and the display portion can be carried out mechanically and electrically, or its configuration can variously be modified. In short, when one display portion is used for displaying many functions of the tape recorder system having many functions, the display portion is made rotatable and fixed to the function to be required.

Further, a display of the tape running direction of the tape recorder and clock can be arranged.

As described above in detail, according to the present invention, one display portion, if the display portion is rotatably provided and the display function is automatically switchable, can be used with several devices in very convenient form.

What is claimed is:

1. A combination tape recorder/calculator in a polyhedron shape having a cassette charging portion of the tape recorder on one side surface of the polyhedron and digit keys for performing standard calculator functions on another side surface of the polyhedron, said combination comprising a rotatable display portion wherein said display portion indicates a count representative of tape movement when said display portion is switched into a first mode by rotating said display portion until it is aligned with said one side surface and said display portion indicates keyboard entries and calculated results when said display portion is switched into a second mode by rotating said display portion until it is aligned with said another side surface.

2. A device as in claim 1, wherein the combination tape recorder/calculator includes a radio having a dial portion on a third surface of the polyhedron, said rotatable display portion indicating the tuning frequency when the display portion is aligned with the third surface.

3. A multi-mode electronic device, comprising a polyhedron shaped body having a plurality of faces, a tape recorder mounted in the body and having a tape charging portion mounted at one face of the polyhedron, a calculator mounted in the body and having a plurality of digital entry keys projecting through a second face of the polyhedron body, a display portion having a display surface and rotatable relative to the body so that the display surface aligns with different ones of the first and second faces in different positions, said display portion having a digital display viewable at the display surface, switch means coupling said display to said tape recorder for indicating tape advance when the surface is aligned with the first face and for coupling the display to said calculator for displaying entry readouts and calculated readouts when the surface is aligned with the second of said faces.

4. A device as in claim 3, wherein a radio is mounted in said body, said radio including at least one control member on a third of said faces, said switch means coupling said radio to said display so that said display exhibits tuning frequencies when the surface is aligned with the third face.

* * * * *